United States Patent Office 3,472,812
Patented Oct. 14, 1969

3,472,812
ABLATION METHODS AND MATERIALS
Joseph J. Byrne, Marblehead, and John E. Wyman, Stoneham, Mass., assignors to Monsanto Research Corporation, St. Louis, Mo., a corporation of Delaware
No Drawing. Continuation of application Ser. No. 324,252, Nov. 18, 1963. This application Jan. 17, 1968, Ser. No. 701,478
Int. Cl. C08c 11/04, 45/04
U.S. Cl. 260—41.5                          11 Claims

ABSTRACT OF THE DISCLOSURE

A method for improving the ablative properties of elastomeric polymers, by incorporating a transition metal dehydrogenation catalyst into an elastomeric polymer. The presence of the catalyst at the time of pyrolysis improves the charring characteristics of the polymer, thereby improving the ablative properties.

---

This invention relates to ablative materials, and more particularly, provides novel methods of producing ablative insulation, and novel ablative compositions containing metallic dehydrogenation catalysts.

This application is a continuation of application Ser. No. 324,252, now abandoned.

Rockets and other space vehicles encounter intense short-term heating both externally, particularly as a result of frictional heating, and internally, as a result of propellant combustion. There is therefore a need for materials of construction which will avoid failure on exposure to these conditions and yet will not increase the weight of the structures excessively. Ablating cooling is one of the most generally useful methods for external and internal insulation against such intense short term heating. In ablative cooling, sacrifice materials are used, which burn away during exposure to the heating, but burn at a sufficiently low rate so that the substrate is protected for the length of time during which the intense heating is applied.

In solid propellant rockets, ablative insulation has been found particularly useful in two kinds of areas. The forward and aft ends of the rocket, at the nose cone and at the divergent section of the motor exhaust, can be made of rigid materials such as reinforced thermosetting plastics. The use of rigid ablative insulation for rocket construction in these areas has received considerable theoretical and experimental study. Ablative compositions are also useful as insulation for the motor case, both externally and internally. However, this area of the rocket is subject to substantial deformation, as a result of elongation of the case and strain imposed by internal gas pressure when the propellant is burning. If the insulation has too low a tensile strength, too high a modulus of elasticity, or both, the insulation will crack and allow the hot combustion gases to burn through the motor case. It is therefore essential that the insulation for the motor case be flexible and elastomeric. Elastomeric-based insulation is also preferable to rigid polymeric insulation because of lower density. Development of the art of elastomeric ablative compositions has not kept pace with that of rigid ablative materials, however.

Char formation is a particular problem in connection with elastomeric ablative materials. The thermosetting polymers employed to produce rigid ablative structures may be char-forming materials such as phenolic resins. The cross-linking which is characteristic of such thermosetting polymers apparently favors pyrolytic degradation by a mechanism favorable to the production of large amounts of carbonaceous residue. On the other hand, the pyrolytic degradation of elastomeric polymers as a rule proceeds by a different mechanism, such that these polymers form little or no char. The major products of thermal decomposition of elastomeric polymers consist largely of gaseous and liquid hydrocarbons.

It is preferable to have ablative polymers degrade to hydrogen and carbon. Theoretical analysis of an analytical model of an ablating material shows that absorption of heat by carbon in the char layer, transpirational cooling by hydrogen gas, and, at about 6000° F. (combustion chamber gas temperature), formation of acetylene by reaction of the hydrogen with the carbon are the most significant and important mechanisms of heat absorption by an ablating elastomeric insulation material.

Thus the lack of substantial char formation by most elastomeric ablative compositions indicates that these materials are providing less than the optimum insulation theoretically available from such ablative materials.

It is an object of this invention to provide improved methods of providing ablative insulation.

A particular object of this invention is to provide improved elastomeric ablative materials.

These and other objects will become evident upon consideration of the following specification and claims.

In accordance with this invention, a novel method is now provided for producing improved ablative protection on the surfaces of rocket and other space vehicles, comprising aplying to said surfaces an ablative composition comprising essentially an elastomeric binder and a supported transition metal dehydrogenation catalyst distributed in the elastomeric binder.

As will appear hereinafter, the transition metal dehydrogenation catalysts are uniquely effective as ablative composition additives, and particularly the three metals having the highest atomic member in each Period of the Group VIII transition series, nickel, palladium and platinum. Various other dehydrogenation catalysts such as iron oxide, silica-alumina catalysts and the like are significantly less effective.

With the transition metal catalysts of this invention, it is found that substantial increases are produced in the amount of carbonaceous residue formed by a polymer. Moreover, which is of particular value, the catalysts do this when the polymer is a non-charring elastomer, that is, an elastomer of the type which forms little or no char in the absence of such catalysts.

The elastomeric charring ablative compositions so provided, in conformity with the above-seated theoretical analysis of ablation, provide superior insulation as compared to non-charring elastomeric compositions. When an oxy-acetylene torch flame (ASTM Sec. D–20–III–L Proposed Tentative Method 18 February 1959) is applied to the front of a panel of the charring ablative composition, the back remains at a steady low temperature during ablation of the composition up to the break-through point. On similar treatment of a non-charring product, the back side exhibits a steady temperature rise up to breakthrough. This means that in the charring composition, the heat does not get through the insulation until ablation has consumed the protective composition, whereas the non-charring material does allow heat to penetrate to the surface it covers during ablation. Since insulation desirably acts as a heat block, and conduction of heat by an insulation material is undesirable, the charring compositions are thus superior.

The stated compositions are particularly advantageously adapted for rocket motor case insulation. By virtue of their elastomeric properties, they can deform with the motor case without cracking.

In an especially preferred embodiment of this invention, the polymer employed is a substantially saturated aliphatic hydrocarbon elastomer, such as an ethylene-propylene copolymer or an isobutylene-isoprene copolymer containing a low percentage of isoprene and thus low residual unsaturation.

It is known in the cracking art that cyclic structures are generally more desirable than linear structures for catalytic cracking. An aromatic compound is most susceptible to coking, while a cycloaliphatic structure is more easily cracked than a straight chain aliphatic hydrocarbon. Thus, it is unexpected that the greatest amount of cracking to carbon during ablative degradation should be achieved using saturated aliphatic hydrocarbon polymers like ethylene-propylene and substantially saturated butyl elastomers, yet this has been found to be the case.

Because of their greater content of hydrogen and carbon as compared to aromatic materials such as a styrene-butadiene copolymer or non-hydrocarbon materials such as an acrylonitrile-butadiene copolymer, the saturated hydrocarbon elastomers are inherently advantageously adapted to produce large quantities of carbonaceous char and hydrogen gas. They have been found to be desirably responsive to catalytic fillers in accordance with the invention. Moreover, it is found that compositions including this type of saturated hydrocarbon polymer unexpectedly produce larger quantities of char and hydrogen gas when subjected to the high heating rate encountered in rocket applications than they do when heated at a lower rate. Thus, for example, a saturated butyl rubber filled with a catalytic filler and heated at the rate of 2000° F. per minute produces 45 weight percent char, based on weight of polymer, as compared to 7 weight percent char at a heating rate of 30° F. per minute; and a saturated ethylene-propylene copolymer filled with the same catalyst produces 25 weight percent char when heated at 2000° F. per minute as compared to only 4 percent char when heated at 30° F. per minute. Thus these polymers are not only theoretically advantageously adapted for use in accordance with the invention but moreover they are unexpectedly especially responsive under the conditions of use.

The elastomers called butyl rubbers, which are copolymers of isobutylene with small amounts of isoprene, are especially advantageous as the elastomer component of the present compositions, because they remain elastomeric at low temperatures.

Moreover, in studies of combinations of the present catalysts with uncured elastomers, these butyl rubbers are found to give especially high yields of char, amounting to 40 percent of the weight of the elastomer. However, when these butyl rubbers are sulfur-cured, it is found that the char yield drops sharply: the sulfur in these compositions appears to poison the dehydrogenation catalyst.

Elastomeric polymers can be cured by methods using little or no sulfur, such as peroxide or resin cures. Such curing methods, it has been found, can be used effectively to produce compositions in accordance with this invention, employing the butyl rubbers, while maintaining a high char yield.

The wash of the rocket gases across an ablating liner has an erosive effect which makes it desirable to produce chars with high strength.

The metal in the dehydrogenation catalysts employed as fillers in the elastomers to produce ablative materials in accordance with this invention intrinsically have little effect on the nature of the char produced by pyrolysis of the polymer: they influence only its amount. However, it is found that some of the presently employed supported catalysts do have a reinforming action on the char. Nickel deposited on kieselguhr as a filler produces a strong char. Also, nickel on silica produces superior char strength compared with chars produced by rubber filled with carbon.

Still greater char strength and a high yield of carbonaceous residue can especially advantageously be produced by a combination of the presently employed catalytic dehydrogenation catalysts with refractory cofillers such as silica and asbestos. Silica as a cofiller helps increase the yield of carbonaceous residue from the insulating materials. Fibrous asbestos added to the rubber-catalyst matrix has an especially advantageous effect in improving the strength of the char, and the strength and modulus of the insulating composition are also increased by inclusion of this type of cofiller.

The erosion rate during ablation generally decreases as the hardness of the elastomeric composition increases. To minimize the erosion rate, it is desirable to make the Shore A hardness rating of the compositions above 50, and preferably 75–1000. In many cases, the hardness rating of the compositions is readily adjusted by adjusting the elastomer curing conditions; hardness can also be increased by inclusion of a hard, filler such as a styrene or a coumarone-indene resin.

Accordingly, an especially preferred embodiment of the compositions of this invention is a composition having a Shore A hardness above 65 comprising an essentially saturated aliphatic hydrocarbon elastomeric polymer, cross-linked by a non-sulfur curing system, filled with a supported transition metal dehydogenation catalyst and including also a reinforcing refractory cofiller.

THE POLYMERS

In preparation of compositions to be applied as ablative insulation in accordance with the method of this invention, any of a wide variety of polymers can be employed.

The thermosetting polymers used in ablative compositions include, for example, phenolics, epoxies, amines, polyesters and silicones. Thermoplastic polymers which may be used include polymers of tetrafluoroethylene, acrylic esters such as polymethyl methacrylate, nylon, and acrylonitrile polymers and copolymers.

Members of the stated classes may or may not be inherently char-formers, and may or may not be elastomeric.

The phenolics, that is, condensation polymers of an aromatic hydroxy compound such as phenol and an aldehyde such as formaldehyde, are generally rigid and generally tend to produce large amounts of char on pyrolysis.

The thermosetting amine resins such as a melamine-formaldehyde resin are also apt to be rigid, but normally they form only small amounts of carbonaceous residue on pyrolytic degradation.

Epoxides of the bis-phenol A type (diglycidyl ether of isopropylidenebisphenol) cured with aliphatic amines such as ethylene diamine are thermosetting resins which are generally rigid. Epoxides containing high percentages of aromatic rings, such as those produced by reacting epichlorohydrin with a phenolformaldehyde novolac resin and cured with an aromatic curing agent such as phenylene diamine are also quite rigid. On the other hand, using relatively large amounts of a condensation product of a dimerized acid or vegetable oil, such as linoleic acid or linseed oil, with an amine such as ethylene diamine, to cure an epoxy such as bis-phenol A type produces polymeric products which are flexible and resilient, and may be regarded as elastomeric. While the thermoset epoxy polymers are not generally good char-formers, certain combinations of epoxy structure and curing agent do give cured products forming a fairly large quantity of carbonaceous residue.

The silicones contain long chains of alternating oxygen and silicon atoms carrying organic substituents such as methyl, trifluoromethyl, phenyl and chlorophenyl groups. Cross-links between such chains may be oxygen bridges, in which case the resulting thermoset resins are relatively rigid materials, suitable for forming coatings, laminates and the like. The bridges between the siloxane chains may also be organic, formed by peroxide-catalyzed condensation of two pendant methyl groups to form an ethylene bridge, or by addition polymerization of vinyl groups present as silicon atom substituents; the products are then silicone rubbers, which are elastomeric. Again, the charring properties of these polymers depend on the particular structure in question.

Addition polymers are generally thermoplastic and as a rule they are more flexible than thermosetting resins, but they may or may not be char-formers and they may or may not be elastomeric. Polyacrylonitrile pyrolyzes to give a heavy char, while polystyrene yields little or no carbonaceous residue. The homopolymers of acrylonitrile and of styrene are not elastomers, but the copolymers of each of these monomers with butadiene, in which the butadiene is present to the extent of 60–80% of the total, are vulcanizable elastomeric stocks. These elastomers do not form significant amounts of char on pyrolytic degradation.

The stated various rigid, flexible or elastomeric resins and plastics may, broadly, be employed in practicing the method of this invention, as can any other of a wide variety of polymeric materials, including, for example, nylon, polytetrafluoroethylene, polyvinyl chloride, polymethyl methacrylate, polyisobutylene, polyvinyl formal, cellulose, polydiallyl phthalate, polyethylene terephthalate, polyvinyl acetate, polyethylene succinate, polyvinylpyridine, polyethylene, polyoxymethylene, cellulose acetate, urea-formaldehyde resins, polyesters made from a polyol such as ethylene or propylene glycol, an unsaturated polycarboxylic acid much as maleic acid, and an unsaturated cross-linking agent such as styrene or triallyl isocyanurate, resins produced by self-condensation of furfural, and so forth. For the identities of many other available plastics and resins and details of the methods employed for their preparation and processing, reference can be made to standard texts on the polymer art, which fully report such technology. The polymer components employed may be either char producers like the phenolics or non-char-formers like epoxies or silicones, although of course particular benefits are obtained when the present method is applied to the utilization of polymers which alone form little or no char as ablative materials.

It is especially advantageous to employ elastomers as the polymeric component of the ablative insulation in practice of the method of this invention for insulation of solid propellant rocket motor cases.

By the term, elastomer, as used herein is meant either natural or synthetic elastomeric materials, which have the characteristics of natural rubber in that they are elastic. Very frequently the synthetic polymers are called rubbers. Rubberlike elasticity involves large deformations at high rates of deformation, with rapid elongation followed by retraction: the retraction of natural rubber is rapid, but that of the synthetic elastomers is frequently slow. In general, elastomers can be stretched repeatedly to a substantial degree, say, 300%, with subsequent recovery of their initial dimensions, although hard cured elastomers may be much less flexible than this. As will be appreciated by those skilled in the art, the raw stock is generally only plastic: it is resilient and flexible, but not necessarily elastic; upon curing, which cross-links the polymer, it acquires elastomeric properties.

There are a wide variety of elastomeric polymers available in addition to natural rubber. Many synthetic elastomers include halogen substituents. The chlorine-containing elastomers include, for example, polyvinyl chloride, chloroprene, chlorinated and sulfochlorinated polyethylene, and acrylics such as an ethyl acrylate copolymer with 2-chloroethyl vinyl ether. Fluorinated elastomers also include acrylics, which are polyfluoroalkyl acrylates such as poly-1,1-dihydroperfluorobutyl acrylate and poly-3 - trifluoromethoxy - 1,1 - dihydroperfluoropropyl acrylate; other fluorinated elastomers include a vinylidene fluoride/chlorotrifluoroethylene copolymer, a polyester condensate of adipyl chloride and hexafluoropentanediol, a vinylidene fluoride/perfluoropropylene copolymer and the like.

Other elements occurring in non-hydrocarbon elastomers useful in the present connection include silicon and nitrogen. The silicone rubbers, as discussed above, are chains of diorganosiloxanes, which usually contain 5000 to 10,000 monomer units. The organic substituents of the silicon atoms may be methyl groups or may at least partly be phenyl, fluoromethyl or like organic substituents. Methyl groups may be condensed to form ethylene bridges between chains, or the chains may be cross-linked by polymerization of vinyl substituents on the silicon atoms. Room-temperature-vulcanizing silicone rubbers generally have hydroxy or alkoxy substituents on the silicon atoms, which are condensed to form silicone bridges. The nitrogen-containing rubbers are exemplified by such elastomers as butadiene-vinyl-pyridine copolymers, butadiene-acrylonitrile copolymers and the like; generally the butadiene is present to the extent of 60–80% of the total weight of material. Still other important nitrogen-containing elastomers are the polyurethanes, prepared by condensation of an isocyanate such as toluene diisocyanate with a difunctional prepolymer such as a polyethylene glycol or a polyester made by condensing a dibasic acid such as adipic acid with a diol such as ethylene glycol, for example.

Particularly preferred in the present connection are the elastomeric polymers in which at least a major part of the polymer chain consists of carbon and hydrogen, the elemental components susceptible of producing effective ablative insulation efficiency in accordance with this invention. By a major part is meant at least above 50% and preferably at least above 75% of the weight of the polymer.

The elastomers produced by addition polymerization of hydrocarbon olefins are especially preferred in the present connection. These may be unsaturated polymers. They may contain aromatic unsaturation, like the styrene elastomers as exemplified by styrene-butadiene copolymers. More preferably, however, hydrocarbon polymers of exclusively aliphatic olefins are employed in the present connection. When an aromatic monomer such as styrene is employed, the polymer contains residual aromatic unsaturation, and this detacts from its potential high carbon/hydrogen content.

Polymers containing residual aliphatic unsaturation, such as natural rubber, steroregular cis-polyisoprene, and elastomers produced from a diene like butadiene, alone or copolymerized with other monomers such as isobutylene are also useful for the present purposes. However, they are still less favorable than the substantially saturated aliphatic hydrocarbon mono-olefin polymers.

Thus a substantially saturated aliphatic hydrocarbon polymer such as an ethylene-propylene copolymer or a butylene-butadiene copolymer containing less than 5 mole percent butadiene is an especially preferred polymer for use in preparing the composition of the present invention.

The methods of producing the presently useful elastomers are well known in the art: for example, redox systems are commonly employed to polymerize hydrocarbon olefins to produce elastomers, and so forth. Most of these materials are commercially available.

CROSS-LINKING AGENTS

The uncured elastomer stocks are generally weak materials with poor mechanical properties. Cross-linking the chains converts them to higher molecular weight products with improved mechanical and elastomeric properties.

The polymeric elastomer gum stocks with residual unsaturation, particularly natural rubber and the copolymers of olefins with dienes like butadiene and isoprene, are conventionally cured with sulfur. Vulcanizing agents for unsaturated rubbers like natural rubber and the polymers and copolymers of butadiene, isoprene and the like frequently include 2 or 3 phr. (parts per hundred parts of the rubber) of sulfur, generally combined with other sulfur-containing compounds such as mercaptobenzothiazole and its derivatives, N,N-dialkyldithiocarbamic acid compounds, and so forth. Such sulfur cures can be used in producing the compositions of this invention including an elastomer as the polymer component if desired.

It is also possible to cure unsaturated elastomer gum stocks alternatively, using little or no sulfur. Such cures are designated non-sulfur cures. They may use low amounts of sulfur, such as less than 0.5 phr., in combination with a poly-unsaturated monomer such as divinylbenzene and a peroxide polymerization catalyst such as dicumyl peroxide, di-t-butyl peroxide, benzoyl peroxide or the like. Cure of unsaturated rubbers can also be effected using a sulfur-free curing system such as a phenol-formaldehyde low molecular weight resin (of say, 10 repeating units), a brominated phenol-formaldehyde low molecular weight resin, a coumarone-indene resin and so forth. Particularly in the case of elastomers exhibiting sensitivity to sulfur cures, with respect to char formation promoted by catalysts in accordance with this invention, such as the copolymers of isobutylene with butadiene, the use of non-sulfur cures, and especially, sulfur-free cures is advantageous. These may be, for example, systems such as the stated peroxide and resin systems, or other curing systems including less than 0.5 phr. sulfur.

In the rubber curing systems used to effect cross-linking of unsaturated gum stocks, various other usual vulcanizing system components, such as zinc or magnesium oxide, stearic acid, amines such as phenyl-$\beta$-naphthylamine, and so forth, may and generally will be present.

Elastomer gum stocks lacking residual unsaturation are generally non-sulfur-cured and their usual curing systems are generally adapted for preparation of ablative compositions as provided by this invention.

In general, the curing agents for these stocks are amines and peroxides; particular systems depend on the selected elastomer type, as is known in the art. Again, usual vulcanizing agent adjuvants such as zinc oxide, stearic acid and the like may also be included.

Sometimes it may be advantageous to include secondary vulcanizing agents, such as a thermally stable dialkyl peroxide, to introduce cross-linking at a temperature above the normal curing and use temperature, in ablative compositions as presently provided.

THE CATALYSTS

The dehydrogenation catalyst included in the compositions of this invention will be a supported transition metal. The metal employed may be any of the transition metal elements: iron, cobalt and nickel, ruthenium, rhodium and palladium, osmium, iridium and platinum. The three metals having the highest atomic number in each Period of the Group VIII transition series, nickel, palladium and platinum, are preferred, and of these, nickel is especially preferred.

To provide effective catalytic action, the metallic catalysts must be dispersed in particulate form as deposits on particulate supporting substrates, throughout the polymeric portion of the compositions applied in accordance with the method of this invention as ablative insulation.

The nature of the catalyst substrate affects its activity as a catalyst of char formation. Thus, varying results are obtained depending whether the substrate is silica, a silica-alumina or a silica-alumina-magnesia combination, alumina, kieselguhr, asbestos, charcoal or the like. Any of the stated materials can also be used as substrates, but some will be more effective than others.

The quantity of catalyst employed, referred to the weight of the polymer, can vary widely. On the one hand, the weight-percent of active metal catalyst does not appear to be of major importance. With the same metallic element deposited on different substrates, essentially equally high yields of char are obtained with the same proportion of supported catalyst to polymer by a supported catalyst filler containing only 5 weight percent metal and by one containing 67 weight percent metal.

On the other hand, with the metal concentration in the supported catalyst held constant and the polymer varied, sometimes the char yield increases continually with increase in amount of supported catalyst filler, and sometimes the char yield goes through a maximum and then decreases as the proportion of supported catalyst filler to polymer is increased further. With a particular supported catalyst and polymer system, there is usually a minimum ratio of the supported catalyst to polymer below which the char yield from the polymer is not significantly affected by the presence of the catalyst: at least an amount of catalyst effective to improve the char yield from the polymer on ablation measurably, say at least by 10%, will be employed in accordance with this invention.

COFILLERS

An especially preferred composition in accordance with the present invention includes reinforcing, preferably refractory fillers, in addition to the catalytically active material. These reinforcing fillers enhance the mechanical properties of the compositions and contribute additional strength to the char. Examplary of materials which may be used in this connection as dispersed refractory fillers are asbestos (crysotile or crocidolite), fluorinated asbestos, graphite, or other carbon materials, carbides such as silicon carbide, and so forth. Metal fibers can be used to provide refractory reinforcement as can powdered metals like steel and brass. Organic fillers are also sometimes useful, such as addition polymers like nylon and polyacrylonitrile, and condensation polymers such as phenol-formaldehyde resins (as Microballoons, for example), alone or in combination with inorganic reinforcing fillers. Silica, glass, quartz, titania, magnesia, zirconia, salts such as inorganic silicates or titanates like potassium titanate, mica, alumina and the like may also be included; as is known, highly pure silica materials are preferred, such as 97% or higher silica products. The forms of the dispersed materials may be powders, fibers, flakes, microspheres or the like. In addition to disperse cofillers, the compositions of the invention may also if desired include reinforcing structures such as mats of glass fiber, nylon, graphite cloth, or like reinforcement. Indeed, the asbestos and silica mentioned above may be incorporated in the form of felts, fabrics, mats, tapes or the like, rather than being dispersed in the polymer as loose particles.

The amounts of these filler materials are not critical. In general, their action as reinforcing fillers is independent of the catalytic action of the dehydrogenation catalyst fillers, and the amounts to be used of these materials can be judged independently by their effect on the properties of the elastomeric compositions.

In addition to the above-discussed reinforcing fillers of generally refractory nature, which enhance the strength of the present compositions and usually contribute to char formation, fillers employed in accordance with the present invention may comprise materials included to enhance the hardness of the elastomeric compositions. The resinous hardeners for synthetic elastomers known in the art, such as styrene copolymers with 10–30% butadiene or indeed, homopolymers, coumarone-indene resins and the like, are suitable organic fillers for this purpose, used in conjunction with butyl rubbers (isoprene-butadiene copolymers), styrene-butadiene elastomers (styrene copolymers with 40–60% butadiene), and the like. Carbon black fillers, as is known, also generally increase elastomer hardness appreciably.

PREPARATION OF COMPOSITIONS

Preparation of the compositions in accordance with this invention comprises dispersing the selected catalyst and filler materials throughout the organic polymer matrix. Dispersion of materials in the polymeric compositions can be accomplished by milling or like techniques. Curing, where appropriate, is effected in accordance with the procedures usual in the art: the curing agents are incorporated in the matrix comprising the uncured polymer and the resulting composition is heated, generally under pressures such as 500–3000 p.s.i., to temperatures sufficient to initiate action of the curing agents. By adjustment of curing agent, inclusion of hardening resins or the like, the compositions are preferably produced with a Shore A hardness rating at least above 50, and generally, for minimal erosion rates, 75–100. Mechanical properties of the cured compositions may also be monitored, and adjusted by variations in curing agents and conditions, for example; in general, the elastomeric compositions of this invention are desirably cured to produce tensile strengths of at least 50–200 p.s.i. and elongations of at least 20–200%, for example.

Application of ablative compositions in accordance with this invention to structures requiring insulation from short intense heating can be conducted by means known in the art. For example, a sheath of the cured compositions can be precured and then bonded to the rocket case, using an adhesive such as a polyurethane or epoxy composition for example, or the uncured composition may be applied on the surface to be insulated and thereafter heated, to cure and bond it, optionally under pressure, using a vacuum bag for example.

The compositions can be applied to provide ablative insulation for the exterior or interior of rocket motor cases, as propellant liners, as nozzle liners or nose cone heat shields, and so forth.

The compositions may if desired include additional materials contributing to the ablative effectiveness of the insulation such as surfacing treatments or covers, effective to protect the ablating elastomeric composition from erosion by exhaust gases from propellant combustion, and so forth.

The invention is illustrated but not limited by the following examples.

Example 1

This example illustrates compositions in accordance with this invention, prepared from an unsaturated elastomeric copolymer of an aromatic olefinic and an aliphatic diolefinic hydrocarbon.

Compositions with improved ablative properties as provided by this invention are prepared by combining a 42 weight percent styrene copolymer with butadiene with supported Ni, Pd, Pt and Rh catalysts, in the ratio of 50 parts of the supported catalyst material to 100 parts of the rubber (50 parts by weight per hundred parts rubber, 50 phr.), by mixing on a rubber mill. The nickel catalyst employed is nickel on kieselguhr containing 67 weight percent Ni. The platinum and palladium catalysts are 5 weight percent metal on charcoal, and the rhodium, 5 weight percent Rh on alumina.

To demonstrate the improved char and hydrogen yield of the stated compositions, the compositions are subjected to a controlled high heating rate pyrolysis, in comparison with compositions consisting of the copolymer alone and combined with 50 phr. respectively of silica, asbestos and carbon, which are inert fillers.

Radiofrequency induction heating of a graphite rod is used for the controlled pyrolysis at high heating rates. The graphite rod is enclosed in a tubular vessel with a side arm connected to a cooled receiver, and the pyrolysis sample is placed in a quartz receptacle in a recess drilled axially in the graphite rod. The entire apparatus is purged with dry purified nitrogen, and then the graphite rod is heated for one minute by its resistance to an electric current induced by a radiofrequency generator operating at about 400 kilocycles, with the power input controlling the heating rate at 2000 F. per minute. The gaseous products which do not condense at room temperature are collected and analyzed by vapor phase chromatography. The elastomer char yield is determined by measuring the weight of char remaining in the tube and deducting the weight of catalyst or other filler in the composition.

As will be evident from the following table, neither the unfilled polymer nor the polymers filled with silica, asbestos or carbon produce any substantial quantities of residual char in the test, and the amounts of hydrogen gas produced are also low. By contrast, the compositions including catalytic fillers produce greatly enhanced amounts of char residue and hydrogen gas.

| Filler or catalyst | Wt. percent char | Wt. percent hydrogen |
| --- | --- | --- |
| Nickel | 7.9 | 2.3 |
| Platinum | 13.4 | 2.3 |
| Palladium | 13.1 | 1.8 |
| Rhodium | 3.4 | 1.1 |
| Asbestos | 0 | 0.5 |
| Silica | 1 | 0.7 |
| Carbon | 1 | 0.8 |
| None | 0.3 | 0.3 |

Example 2

This example illustrates further compositions in accordance with this invention, prepared from a partially unsaturated copolymer of olefinic aliphatic hydrocarbons.

Two different isobutylene-isoprene copolymers are employed in producing the compositions described below. The first is a copolymer containing approximately 0.9 mole percent isoprene, and identified as Butyl 268. The second is a copolymer having a 4 mole percent isoprene content and identified as MD–502.

Compositions in accordance with this invention are prepared by combining the stated copolymers with 50 phr. filler comprising a supported metallic dehydrogenation catalyst which is the nickel catalyst described in Example 1. The compositions prepared include ones in which the filler consists entirely of the nickel catalyst, and ones in which the filler consists of mixtures, in the ratios shown below, of the stated nickel catalyst with a low bulk density silica.

High heating rate pyrolysis as described in Example 1, demonstrates the improved char and hydrogen yield produced by these compositions, in comparison with compositions not containing the nickel catalyst, as shown in the following tables:

| Composition, parts by weight | | | Wt. percent products, based on copolymer | |
| --- | --- | --- | --- | --- |
| Butyl 268 copolymer | Nickel catalyst | Silica | Char residue | Hydrogen gas |
| 100 | 50 | 0 | 45.0 | 8.3 |
| 100 | 25 | 25 | 45.0 | 8.2 |
| 100 | 15 | 35 | 37.0 | 6.6 |
| 100 | 8 | 42 | 13.8 | 3.1 |
| 100 | 0 | 50 | 1 | 0.9 |
| 100 | 0 | 0 | 0.5 | 0.6 |

| Composition, parts by weight | | | Wt. percent products, based on copolymer | |
| --- | --- | --- | --- | --- |
| MD–502 copolymer | Nickel catalyst | Silica | Char residue | Hydrogen gas |
| 100 | 50 | 0 | 39.8 | 8.1 |
| 100 | 25 | 25 | 33.1 | 6.7 |
| 100 | 15 | 35 | 32.5 | 5.8 |
| 100 | 0 | 0 | 0.2 | 0.5 |

As a general rule, less char is produced by polymer pyrolysis at a heating rate of 200° F. per minute than at a heating rate of 30° F. per minute, presumably because the initial decomposition products travel out of the hot zone before they can decompose to a carbonaceous residue. For example, this is true of the styrene-butadiene copolymer described in Example 1, as shown by the following data (catalyst composition as described in Example 1).

| | Weight percent char | |
| --- | --- | --- |
| Catalyst | 30° F./min. | 2,000° F./min |
| Nickel | 19 | 7.4 |
| Platinum | 22 | 13.1 |
| Palladium | 22 | 13.4 |
| Rhodium | 8 | 3.9 |

However, surprisingly, the above-described isobutylene-butadiene copolymers with a low degree of unsaturation yield more residue and hydrogen gas at the high heating rate of 2000° F. per minute than they do at 30° F. per minute.

At 2000° F./minute, the above-described compositions containing more than 10 phr. metal catalyst filler yield gaseous products consisting of hydrogen and methane exclusively, whereas the unfilled polymers and the composition containing only silica as filler give gaseous products containing large amounts of ethylene, propylene and isobutylene.

Example 3

This example illustrates compositions in accordance with the invention containing a substantially completely saturated copolymer of aliphatic olefinic hydrocarbons containing a single double bond.

A 43 weight percent ethylene/57 weight percent propylene copolymer is blended with 50 phr. filler comprising the nickel catalyst described in Example 1. Fillers employed include the nickel catalyst itself and mixtures of this nickel catalyst with a low bulk density silica.

The superiority of these compositions with respect to char and hydrogen gas yield as compared to the unfilled polymer and the polymer containing silica alone is demonstrated by the following high heating rate pyrolysis results, obtained by heating at 2000° F./minute as described in Example 1:

| Composition, parts by weight | | | Wt. percent products, based on copolymer | |
|---|---|---|---|---|
| Polymer | Nickel catalyst | Silica | Char residue | Hydrogen gas |
| 100 | 50 | 0 | 25.1 | 4.9 |
| 100 | 25 | 25 | 24.0 | 4.2 |
| 100 | 8 | 42 | 20.4 | 3.9 |
| 100 | 4 | 46 | 8.2 | 2.4 |
| 100 | 0 | 50 | 0.8 | 1.5 |
| 100 | 0 | 0 | 0.3 | 0.4 |

As the foregoing data show, the char residue and hydrogen gas yield are not significantly reduced until the supported catalyst content is lowered to less than 10 phr.; and even at 4 phr., the catalytic material substantially increases the char yield compared to the polymeric compositions not containing the catalyst.

Example 4

This example illustrates additional compositions in accordance with this invention, including other metallic catalysts, made employing a substantially saturated copolymer of aliphatic hydrocarbon olefins which contain a single double bond.

The ethylene-propylene copolymer described in Example 3 is combined with 50 phr. of the platinum, palladium and rhodium catalysts described in Example 1.

To demonstrate the improved char-forming and hydrogen gas yield of these compositions, they are subjected to the 2000° F./minute pyrolysis test described above. The results are shown in the following table, which also includes for comparison the values for the unfilled polymer and the polymer filled with 50 phr. carbon under the same conditions:

| Catalyst or filler | Wt. percent residue | Wt. percent gas | Mole percent $H_2$ |
|---|---|---|---|
| None | 0.3 | 19.1 | 22.3 |
| Carbon | 1.0 | 41.8 | 23.9 |
| Platinum | 7.2 | 37.3 | 43.6 |
| Palladium | 5.5 | 36.8 | 36.5 |
| Rhodium | 5.1 | 39.5 | 37.7 |

Example 5

This example describes compositions in accordance with this invention containing metallic dehydrogenation catalysts and a non-hydrocarbon elastomer.

An acrylonitrile-butadiene copolymer with a 40% weight percent nitrile content is combined with 50 phr. of the nickel catalyst described in Example 1 and pyrolyzed at 2000° F./minute. The char yield is 20.5 weight percent calculated on polymer in the composition. By contrast, the same copolymer under the same conditions without filler yields 1.4 weight percent char, and with 50 phr. silica filler yields 3.9 weight percent char.

Example 6

This example illustrates the superiority of compositions containing supported transition metal catalysts in accordance with this invention as compared to other dehydrogenation catalysts.

The styrene-butadiene (SBR) copolymer described in Example 1 and the ethylene-propylene (EPR) copolymer described in Example 3 are combined, respectively, with 50 phr. of a variety of catalysts as described below to provide ablative compositions in accordance with this invention.

The char yields of the compositions are measured by placing a 2.0 gram sample of each composition in pyrolysis apparatus consisting of a 10 mm. diameter tube placed vertically in a Woods metal bath. The system is evacuated and flushed with nitrogen, and then heated at a rate of 30° F./minute to 930° F. The solid residue is collected and weighed. The results are as follows:

| Elastomer | Catalyst/filler | Wt. percent char |
|---|---|---|
| SBR | None | 0.6 |
| SBR | 5 wt. percent Pt on C | 22 |
| SBR | 5 wt. percent Pd on C | 22 |
| SBR | 67 wt. percent Ni on kieselguhr | 19 |
| SBR | 5 wt. percent Ni on precalcined $SiO_2$ [1] | 9 |
| SBR | 10 wt. percent Ni on precalcined $SiO_2$ [1] | 14 |
| SBR | 5 wt. percent Ni on $SiO_2/Al_2O_3$ | 21 |
| SBR | 10 wt. percent Ni on $SiO_2/Al_2O_3$ | 26 |
| SBR | 25 phr. 10 wt. percent Ni on $SiO_2/Al_2O_3$ +25 phr. $SiO_2$. | 21 |
| SBR | 10 wt. percent V on $SiO_2/Al_2O_3$ | 6 |
| SBR | Iron oxide | 0.3 |
| SBR | Nickel oxide | 1.5 |
| SBR | $SiO_2/Al_2O_3$ | 5.0 |
| SBR | $SiO_2/Al_2O_3/MgO$ | 4.0 |
| EPR | None | 0.4 |
| EPR | 5 wt. percent Pt on C | 9 |
| EPR | 5 wt. percent Pd on C | 4 |
| EPR | 67 wt. percent Ni on kieselguhr | 4.1 |
| EPR | $SiO_2/Al_2O_3$ | 2.0 |

[1] Precalcined $SiO_2$ is wetted with water and heated for 4 hours at 400° C. before deposition of catalyst as described below.

To prepare nickel catalysts as employed in the above described compositions, a slurry of the support in a water solution of nickel nitrate is evaporated to dryness, with stirring. The quantity of nickel nitrate employed is calculated to provide the desired weight-percent reduced metal on the support. The resulting powder is dried for two hours in a circulating air oven at 250° F. in a current of air for 30 minutes. The tube is then purged with dry nitrogen and hydrogen is introduced at 750–840° F. until no more water vapor condenses in the cool end of the tube. The reduced catalyst is then cooled to room temperature under a nitrogen atmosphere.

Other catalysts are prepared similarly.

Example 7

This example describes cured hydrocarbon elastomeric with the invention prepared from a cured elastomeric terpolymer of aliphatic unsaturated hydrocarbons.

An ethylene-propylene terpolymer with a diene, containing about one mole percent residual unsaturation, is combined with 50 phr. of the catalyst described in Example 1, and peroxide-cured with 0.33 phr. sulfur, 2.75 phr. dicumyl peroxide, 1.0 phr. divinyl benzene, and 1.0 phr. calcium stearate, by press-curing 30 minutes at 300° F. and post-curing 4 hours at 150° F. Heating at the rate of 2000° F. per minute gives a char weight which is 16 percent of the original elastomer weight.

Example 8

This example described cured hydrocarbon elastomeric ablative compositions prepared in accordance with this invention.

The ethylene-propylene copolymer described in Example 3 is combined, on a cold, tight mill, with 50 phr. of the nickel catalyst described in Example 1, and with 8.0 phr. of divinylbenzene and 2.7 phr. dicumyl peroxide. The mixture is precured for 30 minutes at 300° F./1000 p.s.i. and postcured four hours at 150° F. at ambient pressure. The resulting composition is identified as EPR below.

The styrene-butadiene rubber described in Example 1 is made up into compositions in accordance with this invention by combination with 50 phr., respectively, of the following catalysts:

(1) 5 weight percent Pt on charcoal
(2) 5 weight percent Pd on charcoal
(3) The 67 weight percent Ni catalyst described in Example 1

To cure these compositions, they are each combined with 5 parts by weight zinc oxide, 2 parts by weight sulfur and 0.5 parts by weight bis(dimethylthiocarbamyl)sulfide, press-cured at 1000 p.s.i. for 30 minutes at 300° F., and post-cured 4 hours at 150° F. The resulting compositions are identified as SBR below.

The resulting cured elastomeric ablative compositions are then pyrolyzed at 30° F./minute, with the following results.

| Polymer | Catalyst | Wt. percent carbonaceous char yield |
|---|---|---|
| EPR | Nickel | |
| SBR | do | 25 |
| SBR | Platinum | 26 |
| SBR | Palladium | 26 |

Example 9

This example illustrates compositions of this invention containing different proportions of catalyst and giving varying gas and carbonaceous residue yields.

The isobutylene copolymer described in Example 2 and identified as Butyl 268 and the ethylene-propylene copolymer described in Example 3 are combined with varying amounts of the nickel catalyst described in Example 1, and the resulting compositions are pyrolyzed at 2000° F. per minute, while the gas and carbonaceous residue yield are measured.

With the butyl polymer it is found that a maximum appear, after which increased catalyst content produces less char and gas yield:

| Catalyst content, phr. | Gas yield, ml./g. rubber | Carbonaceous residue yield, wt. percent based on rubber | Density of formulation, g./ml. at 77° F. |
|---|---|---|---|
| 100 | 1,500 | 27 | 1.297 |
| 70 | 1,430 | 38 | 1.230 |
| 60 | 1,500 | 40 | 1.202 |
| 50 | 1,350 | 43 | 1.171 |
| 40 | 1,360 | 43 | 1.126 |
| 30 | 1,200 | 34 | 1.092 |
| 0 | 400 | <1 | 0.918 |

With the ethylene-propylene polymer, on the other hand, char and gas yield increase continually with increase in catalyst content to 100 phr.:

| Catalyst content, phr. | Gas yield, ml./g. rubber | Carbonaceous residue yield, wt. percent based on rubber | Density of formulation, g./ml. at 77° F. |
|---|---|---|---|
| 100 | 1,500 | 26 | 1.262 |
| 70 | 1,310 | 25 | 1.199 |
| 60 | 1,280 | 19 | 1.161 |
| 50 | 1,100 | 20 | 1.155 |
| 40 | 1,090 | 19 | 1.095 |
| 0 | 265 | <1 | 0.857 |

Example 10

This example illustrates compositions in accordance with the invention including a butyl rubber, cured with a resinous curing agent.

The isobutylene copolymer identified as Butyl 268 is combined with 40 phr. of the nickel catalyst described in Example 1, 3 phr. of a bromomethylated phenol-formaldehyde resin identified as SP–1055, 5 phr. zinc oxide and 1 phr. stearic acid and cured at 300° F., 30 min., 1000 p.s.i. The residue char yield of this formulation at 2000° F. per minute is 30 weight percent based on the rubber.

Example 11

This example illustrates further cured elastomeric compositions in accordance with the invention, containing nickel catalysts, with and without co-filler.

Butyl compositions are prepared by combining Butyl 268 with 40 phr. of the nickel catalyst described in Example 1, 4 phr. of the bromomethylated phenol-formaldehyde resinous curing agent identified as SP 1055, 5 phr. zinc oxide, 1 phr. stearic acid and additionally, fillers as set forth below. An ethylene-propylene based composition is prepared by combining 100 parts of the ethylene-propylene copolymer described in Example 3, 60 phr. of the same nickel catalyst, 40 phr. silica, 2.8 phr. dicumyl peroxide and 0.35 phr. sulfur. The compositions are each press-cured for 1 hour at 300° F. and 500 p.s.i. Pyrolysis at 2000° F. per minute produces the following char and gas yields:

| Added filler | Wt. percent carbonaceous residue based on rubber | Volume of gas, ml./g. of rubber |
|---|---|---|
| A. Saturated butyl rubber plus 40 phr. nickel catalyst | | |
| 40 phr. silica | 44 | 1,550 |
| 20 phr. silica | 40 | 1,550 |
| 40 phr. asbestos | 30 | 1,600 |
| 40 phr. nickel catalyst | 38 | 1,700 |
| 20 phr. asbestos | 17 | 1,350 |
| None | 14 | 1,000 |
| B. Ethylene-propylene rubber plus 60 phr. nickel catalyst | | |
| 40 phr. silica | 24 | 1,200 |

As the above data show, silica at the same content gives a higher char yield than asbestos. The silica-filled insulating materials produce less friable chars than the compositions lacking the silica co-filler but the strongest char is produced by the compositions including fibrous asbestos.

Example 12

This example illustrates the superior qualities of compositions provided in accordance with this invention.

An ablative composition having a Shore A hardness rating of 80 and comprising a supported transition metal dehydrogenation catalyst is prepared by combining the isobutylene copolymer with isoprene described in Example 2 and identified as Butyl 268 with 40 phr. of the 67% nickel catalyst described in Example 1, 70 phr. fibrous asbestos, 5 phr. ZnO, 4 phr. of the phenol-formaldehyde resin identified as SP–1055 described in Example 10, 1 phr. stearic acid and 2 phr. of stannous chloride dihydrate, and curving composition at 300° F. and 2000 p.s.i. for 30 minutes.

For comparison, a second composition not including a transition metal catalyst is prepared by combining the same elastomer with 100 phr. fibrous asbestos, 5 phr. ZnO, 4 phr. of the resin identified as SP–1055, 1 phr. acid and 2 phr. $SnCl_2 \cdot 2H_2O$, which is cured under the same conditions as above stated.

The 2000° F./minute test described in Example 1 gives the following results for the two compositions:

| | Containing catalyst | Not containing catalyst |
|---|---|---|
| Carbonaceous char yield (wt. percent based on elastomer content) | 25 | 1 |
| Total char yield (wt. percent based on total sample) | 55 | 42 |
| Gas yield (ml./g. total sample weight) | 650 | 395 |

The two compositions are further subjected to an oxyacetylene torch test in which they receive a heat flux of 200 calories per centimeter-second, designed to conform to ASTM Method D–20 III L. The erosion rate of the samples, the time to burn-through of the ¼ inch thickness of the samples, and the insulation index (time for back face to reach 200° C. divided by thickness in centimeters) are measured, with the following results:

| | Containing catalyst | Not containing catalyst |
|---|---|---|
| Erosion rate, mils/sec | 5.5 | 7.0 |
| Time to burn-through, secs | 52 | 40 |
| Insulation index | 61 | 48 |

While the invention has been described with particular reference to specific preferred embodiments thereof, it will be appreciated that modifications and variations can be made without departing from the scope of the invention as disclosed herein, which is limited only as indicated in the following claims.

What is claimed is:
1. An improved ablative insulation material consisting essentially of a non-sulfur cured composition comprising an elastomeric polymer and a supported transition metal dehydrogenation catalyst in an amount sufficient to increase the char yield of said elastomeric polymer on ablation by at least 10%.
2. The composition of claim 1 further including a filler chosen from the group consisting of silica, asbestos, carbon and mixtures of these.
3. The composition of claim 1 wherein said metal is chosen from the group consisting of the transition metals having the highest atomic number in each of Periods 4–6 of Group VIII of the Periodic Table.
4. The composition of claim 1, wherein said metal is nickel.
5. The composition of claim 1 wherein said elastomeric polymer is chosen from the group consisting of an isobutylene copolymer with less than 5 mole percent butadiene, an ethylene-propylene copolymer, a styrene-butadiene copolymer, and an acrylonitrile-butadiene copolymer and mixtures of these.
6. An improved ablative insulation material consisting essentially of a non-sulfur cured composition comprising:
(a) an elastomeric polymer chosen from the group consisting of an isobutylene copolymer with less than 5 mole percent butadiene, an ethylene-propylene copolymer, a styrene-butadiene copolymer, an acrylonitrile-butadiene copolymer and mixtures of these,
(b) a filler chosen from the group consisting of silica, asbestos, carbon and mixtures of these, and,
(c) a supported transition metal dehydrogenation catalyst wherein said metal is chosen from the group consisting of the transition metals having the highest atomic number in each of Periods 4–6 of Group VIII of the Periodic Table, the amount of said catalyst being sufficient to increase the char yield of said elastomeric polymer on ablation by at least 10%.
7. The composition of claim 6 wherein said composition has a Shore A hardness of at least 75.
8. A method for improving the char yield of a non-sulfur cured ablative insulation composition which comprises the steps of:
(a) preparing a mixture comprising a supported transition metal dehydrogenation catalyst and an elastomeric polymer, the amount of said catalyst included being sufficient to increase the char yield of said polymer on ablation by at least 10%, and
(b) curing the resulting mixture with a non-sulfur curing system.
9. The method of claim 8 wherein said mixture further contains a filler chosen from the group consisting of silica, asbestos, carbon and mixtures of these.
10. The method of claim 8 wherein said transition metal is chosen from the group consisting of the transition metals having the highest atomic number in each of Periods 4–6 of Group VIII of the Periodic Table.
11. The method of claim 8 wherein said elastomeric polymer is chosen from the group consisting of an isobutylene copolymer with less than 5 mole percent butadiene, an ethylene-propylene copolymer, a styrene-butadiene copolymer, an acrylonitrile-butadiene copolymer and mixtures of these.

References Cited

UNITED STATES PATENTS
2,842,504  7/1958  Jones.

FOREIGN PATENTS
859,696  1/1961  Great Britain.

MORRIS LIEBMAN, Primary Examiner
S. L. FOX, Assistant Examiner

U.S. Cl. X.R.
260—37, 41